United States Patent [19]

Romeas et al.

[11] Patent Number: 4,631,713
[45] Date of Patent: Dec. 23, 1986

[54] CALIBRATION DEVICE OF THE OPTICAL POWER APPLIED TO AN OPTICAL DISC FOR RECORDING OF DATA

[75] Inventors: René Romeas, Palaiseau; Claude Bricot, Villejuif; Jean-Louis Gerard, Les Ulis, all of France

[73] Assignee: Thomson-CSF, Paris, France

[21] Appl. No.: 611,535

[22] Filed: May 17, 1984

[30] Foreign Application Priority Data

May 20, 1983 [FR] France ............................. 83 08425

[51] Int. Cl.⁴ .............................................. G11B 7/125
[52] U.S. Cl. ...................................... 369/54; 369/116; 369/111
[58] Field of Search ................. 346/76 C; 369/48, 54, 369/58, 59, 111, 116, 124, 109; 358/342

[56] References Cited

U.S. PATENT DOCUMENTS

| | | | |
|---|---|---|---|
| 4,189,746 | 2/1980 | Valachovic | 358/342 |
| 4,225,873 | 9/1980 | Winslow | 358/342 |
| 4,419,750 | 12/1983 | Howe | 369/116 |
| 4,426,693 | 1/1984 | Satoh et al. | 369/116 |
| 4,516,235 | 5/1985 | Tarzaiski | 369/116 |

FOREIGN PATENT DOCUMENTS

| | | |
|---|---|---|
| 0028111 | 5/1981 | European Pat. Off. . |
| 0044072 | 1/1982 | European Pat. Off. . |
| 0087174 | 8/1983 | Euporean Pat. Off. . |
| 3131212 | 3/1982 | Fed. Rep. of Germany . |
| 2424603 | 11/1979 | France . |
| 2472243 | 6/1981 | France . |

*Primary Examiner*—Donald McElheny, Jr.
*Attorney, Agent, or Firm*—Oblon, Fisher, Spivak, McClelland, & Maier

[57] ABSTRACT

The device according to the invention realize the following steps:
 (a) recording of binary test words on an optical disc associated to distinct engraving optical powers and comprising monotonous series of "1" and "0" logic bits of equal duration;
 (b) reading of these words;
 (c) measurement of the durations of these bits in the "1" state and bits in the "0" state,
 (d) determination of the optical power for which this ratio is closest to one;
 (d) elaboration and putting in memory of a control signal allowing to obtain this power.

In a preferred variant, several test words are recorded and an interpolation is carried out between the measurements.

15 Claims, 8 Drawing Figures

CALIBRATION DEVICE OF THE OPTICAL POWER APPLIED TO AN OPTICAL DISC FOR RECORDING OF DATA

FIELD OF THE INVENTION

Background of the Invention

The present invention concerns a calibration device of the optical power of a engraving luminous radiation beam applied to an optical disc utilized for the recording of data, in particular, an automatic calibration device for the recording of digital data.

The digital optical discs of the prior art are generally discs at the surface of which has been deposited a layer that is sensitive to luminous radiations, on which it is possible to engrave through the intermediary of a luminous radiation source (in or out of the visible spectrum) binary-type data. This engraving is most often obtained through the action of heat given off by luminous radiations of a focussed beam, upon impact on the sensitive layer. The engraving obtained is, according to the case, constituted either of a perforation of this layer, or in the form of micro-bubbles of micro-reliefs, or of any other modification of this layer. It is easy to observe, under these conditions, that the geometry of the engraving obtained is closely bound to the luminous power applied to the sensitive layer and thus that this power must be able to be accurately controlled and adjusted.

The luminous power to be applied to the sensitive layer, in order to obtain correct engraving, depends on several parameters and among which principally:

the quality of the optical elements disposed between the sensitive layer and the luminous radiation source (lenses, prisms, ... ), quality which furthermore, can be modified in time by variation of the state of the surface due to aging and dustiness;

the incidence angle of the engraving luminous beam with respect to the layer, angle depending on the tolerances of the disc and the associated mechanics;

the sensitivity of the material forming the layer itself that can vary slightly from one disc to another;

the system used for servo-focussing of the beam which presents limited performances; a slight error of focussing of the luminous spot on the sensitive layer thus necessarily remains;

variations of the parameters of the luminous radiation itself (most often it concerns a semi-conductor laser) adapted to vary in substantial proportions of a source to another and also to be affected by aging;

the limited accuracy of the electronic control and adjustment system of the power emitted by the luminous radiation source.

The calibration devices known up to now only allow to control part of these parameters; for example, the optical power emitted by the source can be controlled by using an appropriate system for measuring the optical power, this system can take into account part of the parameters of the optical system (dustiness) but it is altered by error due to the measuring system itself, that, furthermore, can vary in time. The parameters associated to the disc and to the error of the servomechanisms together with deformations of the luminous spot are not taken into account by such a system.

The object of the invention is a calibration device that overcomes the drawbacks outlined herein-above.

The calibration device according to the invention operates a means of testing the whole of the parameters cited herein-above and liable to influence the geometry of the engraving obtained.

The invention concerns a device for recording data in an optically detectable form at the surface of a data support comprising a material sensitive to optical radiation, the said device comprising means for focussing in the said surface a writing optical beam electrically modulable by an incident electric signal representative of the said data, means ensuring the exploration of the said surface by the said writing beam, electrooptical reading means the interaction of which with the modifications of optical characteristics of the said surface produces an electric reading signal control means allowing to adjust the power of the writing beam in such a way that the reading signal suitably reproduces the temporal distribution of the impulses constituting the said incident electric signal, wherein binary test words are registered separately from the said data with several staggered power values of the said beam in reserved zones of the said surface and wherein the analysis of the reading signal corresponding to these values allows to determine which of the said values is most suitable for recording the said data in a section adjacent to the said zones; the said control means comprising a calibrating circuit associated to a control or drive circuit of the radiation supply; the said calibrating circuit comprising a memory logic circuit controlling the writing and the reading of the said binary test words according to a predetermined cycle and an analysis circuit of the reading signal delivering tested values to the memory logic circuit, in order to set a power value on the writing beam, retained until the following cycle.

BRIEF DESCRIPTION OF THE DRAWINGS

The invention will be better understood and other characteristics and advantages will appear from reading the following description with reference to the annexed drawings in which.

The principal lay-out of the calibrating device according to the invention will first of all be described.

According to the invention, for example at the beginning and at the end of the useful recording zone of an optical disc, several tracks are reserved on which, in a first time, a particular binary configuration message is engraved, the message being delivered by a suitable recording system and comprising successive recordings of a single binary word, carried out using different staggered luminous powers to either side of the power value presumed good to obtain a correct engraving.

In a second time, the previously recorded binary message is readout and the signal issuing from this reading processed by using appropriate electronic means, so as to determine what engraving optical power gives the best results. Futhermore, it is likely that, taking into account the power response of the sensitive layers, several power levels have given suitable results. In this case, of course, it is the average value of these different levels that is selected for future engravings.

The correct optical power value, once determined, is electronically put in memory and will be utilized to carry out all the recordings that will follow until it is judged useful to actuate a new test. The periodicity of these tests can be either determined by the operator or, preferentially, automatically according to a program determined in advance. This can be, for example, at each loading of a new disc in the engraving-reading apparatus and at regular time intervals (every 24 or 48 hours) if the same disc remains permanently in the apparatus.

The interest of having test tracks at the beginning and at the end of the disc is to be able at the same time to put in memory the correction law of engraving power in function of the radius. Indeed, the law of variation of the engraving power in function of the radius being determined by an interpolation between the values obtained for the powers necessary for the engraving in the central zone and in the peripheral zone of the disc, it is possible to obtain for any other value of the radius, the necessary power.

Preferentially, the calibration process according to the invention operates the same reading and engraving means and the same recordable support as those used for recording useful binary messages, a wrong recording power thereby becomes very improbable.

DETAILED DESCRIPTION OF THE DRAWINGS

The invention will now be described in more detail with reference to FIGS. 1 to 6.

Figure 1:
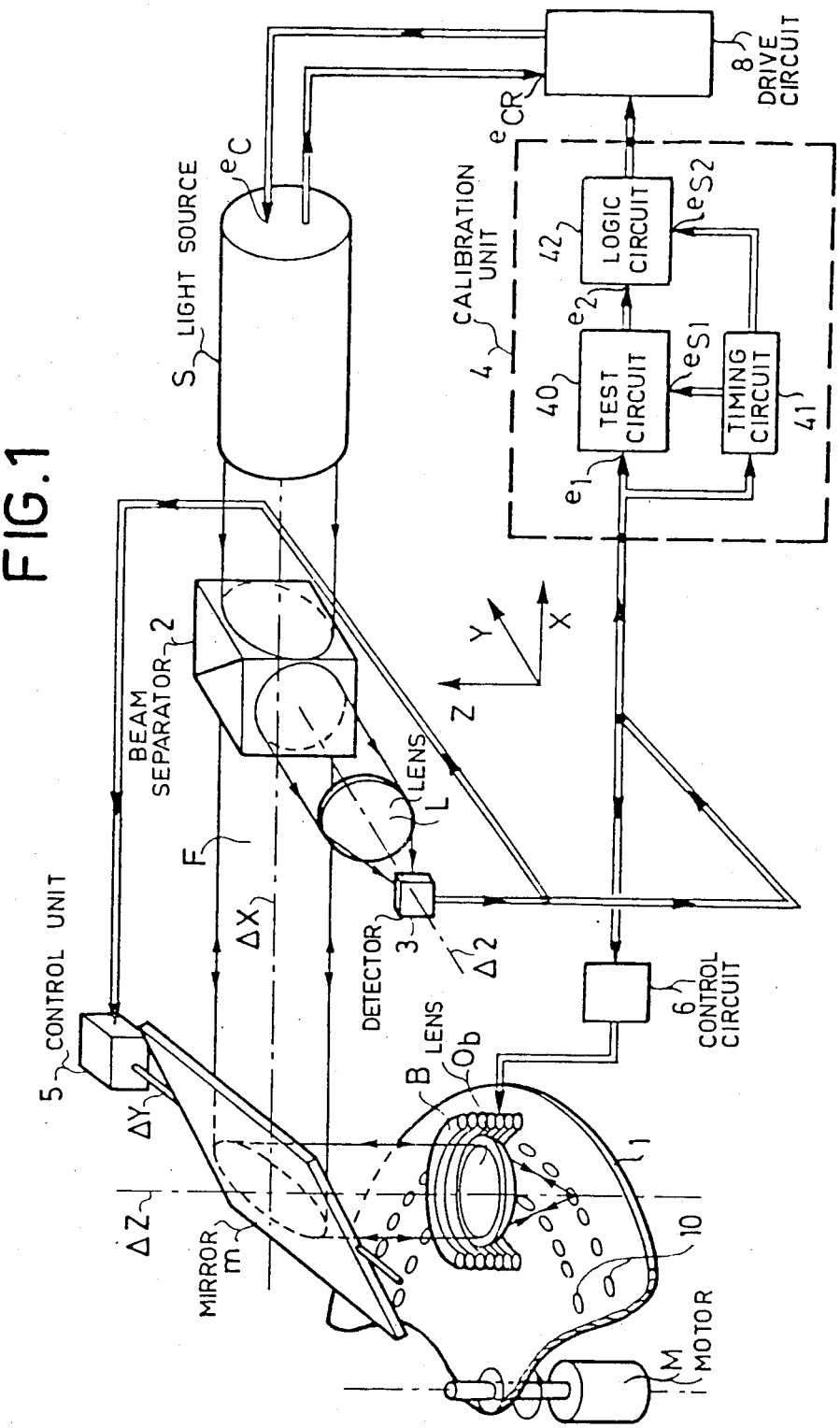
FIG. 1 represents schematically an optical disc recorder in which the invention can be operated.

FIG. 1 is a synoptic schema of an engraving-reading apparatus of optical discs including calibration means for the engraving power of carrying out the invention.

This apparatus comprises means common to those generally utilized in the prior art and only the means necessary for understanding the present invention have been represented.

This apparatus is intended to record on a disc 1 binary data arranged according to a predetermined geometric configuration. For the recording of digital data, an arrangement of concentric circular tracks 10 is used, comprising or not pre-registed guiding data, for example, smooth continuous pre-registered tracks or "flags" distributed throughout the length of the virtual tracks and between which the useful data is recorded.

Such a disc can be utilized, either to record data in a determined point of one of the tracks, or to read the data recorded on any point of this track. The disc, for example, of a diameter of about 30 cm, is made to move in rotation by convention, about an axis parallel to one of the axes, Z, of a cartesian trihedron XYZ. This movement is communicated by a driving motor M integral with the frame of the recording reading optical system. In the realization example illustrated in FIG. 1, the access device to a predetermined track 10 of the disc 1 includes a fixed part comprising a luminous energy source and a mobile part constituted by the recording -reading head. As known, this latter comprises a microscope $O_b$ type objective, integral with an electromagnetic coil B being displaced in the magnetic field of a permanent magnet (not represented) ensuring the vertical servocontrol and a glavanometric mirror m ensuring the radial servocontrol. The luminous energy sources, as is equally known, comprise laser sources, for example helium-neon (HeNe) gas lasers or semi-conductors. The gas lasers deliver a polarized parallel beam the section of which is very small. The laser beam must be widened so as to cover the entrance pupil of the objective, whatever the position of the objective along the optical axis. The semi-conductor laser sources emit a divergent beam inscribed in a cone of an elliptical section. It is thus necessary to utilize an anamorphosing member and optical elements (lenses, etc . . . ) rendering cylindrical the emitting beam. These dispositions depart from the scope of the present invention and are well known to the man skilled in the art. It will be supposed from the following description that the beam emitted by the source S is a beam of parallel rays. It will also be supposed, without this being limitative, that the beam emitted by the source S is linearly polarized and that the reading and the detection of the data recorded is carried out by reflection. A separator optical element 2 disposed on the path of the beam of parallel rays F allows to discriminate the incident beam, emitted by the source S, of the reflected beam that is retransmitted to electro-optical detection means 3 associated to a focussing element, represented in the form of a convergent lens L.

The separator optical element 2 is in the example illustrated in FIG. 1 constituted by a separator polarization cube. This cube is generally associated to a bidirectional conversion element of the linear polarization into a circular polarization, element disposed on the output face of the cube 2, i.e. the face opposed to the opposite facing face with the source S. Such dispositions are described, among others, departing from the scope of the invention and by way of example, in French Patent application published under n° 2 483 664.

Instead of a separator cube, other, equally conventional means can be used, such as a partially reflecting mirror.

The beam of light F focussed on the disc is partially reflected by it and sent back through the intermediary of the prism 2 and of the lens L on the reading cells coupled to an amplifier and comprised in the electro-optical electronic detection means 3 of which the output is coupled to the calibration unit 4 of the invention and to servo-mechanisms: control unit 5 and control circuit 6.

During reading, as is known, the signals are also derived from output signals of the electro-optical detection means, signals representing the recorded data.

Correct focussing is ensured by the servo-device or control circuit 6 acting upon the objective $O_b$ through the intermediary of the coil B, the spot following of the track is ensured by the servo-device or control unit 5 and the mobile mirror m.

The calibration device 4 according to the invention, in the actual realization example represented in FIG. 1, comprises a test circuit 40 receiving on one input $e_1$, output signals of the electro-optical detection means 3, a synchronization or timing circuit 41 also receiving the output signals of the electro-optical detection means 3 and elaborating synchronization signals. The test circuit 40, after processing and adapting the signals received, retransmits them to a logic signals processing circuit 42 (input $e_2$). Preferentially, this circuit is constituted by a microprocessor but can be constituted by any analogous circuit such as a wired logic circuit or programable logic array (PLA).

These circuits 42 control the optical power emitted by the source S (input $e_c$) through the intermediary of a control or drive circuit 8 that receives feedback (input $e_{CR}$) signals representative of this emitted power.

The circuit 41 supplies the synchronization signals to the circuits 40 (input $e_{S1}$) and 42 (input $e_{S2}$).

The different components of the device according to the invention will now be specifically described.

It is not necessary to describe in detail the electro-optical detection means 3 that can be prior art. They comprise photo-detector elements, for example, a four quadrants cell of the type described in the French Patent application published under n° 2 483 664.

This cell is followed by amplifier stages that elaborate at the output representative signals of the engraving state of the optical disc 1, i.e. the reading of the data recorded on the tracks 10.

From these same signals can be extracted synchronization signals, for example, in the way described in French Patent application filed under n° 82 04218 on March 12, 1982 in the name of the applicant. These synchronization signals act to sample the transmission of the reading signals of test circuits 40 to logic processing circuits 42, then to the control circuits 8.

These logic processing circuits, if it concerns a microprocessor, according to one advantageous aspect of the invention, can have a multiple role. Indeed, other than the specific role that they play within the scope of the invention, they can also be utilized for other management duties relative to the operating of the reading-writing apparatus of the optical disc.

In reality, in a preferred variant, the device of the invention utilizes in shared time the data processing means, generally a microprocessor, with which this type of apparatus is generally equipped. It is sufficient to foresee a set of instructions specific to the realization of the process according to the invention, put into memory in any appropriate form, generally registered in a control read-only memory in the form of a resident program. In the following description, in order to simplify matters, it will be considered that the control circuits 42 are constituted by a microprocessor.

In one particular realization example, this control microprocessor 42 of the apparatus sends to the control system 8 of the luminous power emitted by the source S a writing order, at previously programmed powers, of eight binary messages, that can be, in the example chosen, eight times a train of 64 bits, and staggered according to a linear law on either side of a supposed value, a priori appropriate to obtain a correct engraving.

This determination can be obtained a priori by experimenting, by statistic tests, or by calculation.

It is supposed that the cyclic ratio of the binary recording control signals is equal to one.

Figure 2:
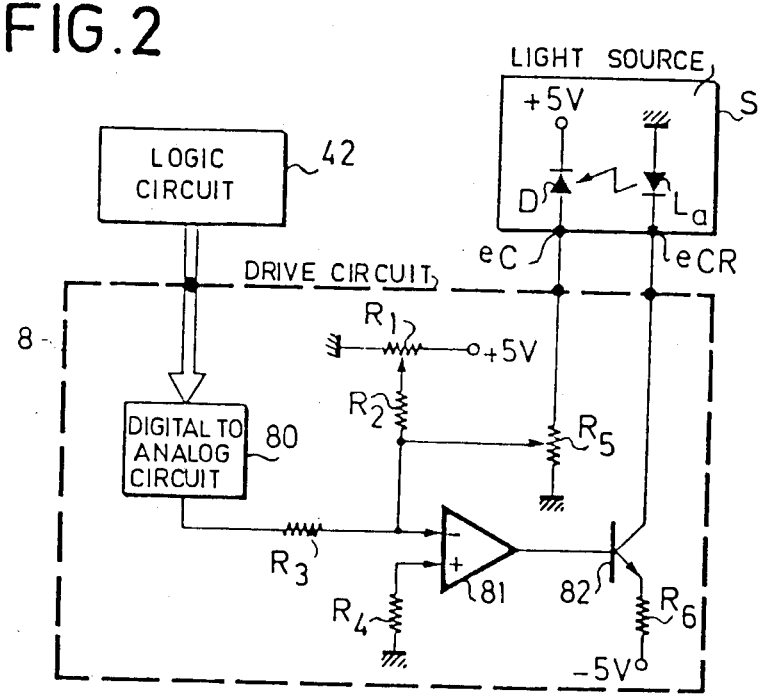
FIG. 2 represents a particular circuit utilized within the scope of the invention for measuring and controlling the optical power emitted by a source.

FIG. 2 represents a particular realization of the control or drive device 8 of the luminous power emitted by the source S.

The control microprocessor or logic circuit 42 of the apparatus sends power control data through the intermediary of four transmission lines to a digital analogical converter 80 disposed as input stage in the power control circuits 8. It is thus possible to obtain at the output of the converter 80 sixteen levels of current that are different and regularly staggered. Among these sixteen levels, eight are selected by the microprocessor. A differential amplifier 81 amplifiers the output current of the converter 80 and controls through the intermediary of a power amplifier stage of transistor 82 the current passing through a laser diode comprised in source S (input $e_c$). A photoelectric cell D, is coupled to the rear emitting face of this laser diode S and the current of this cell D (output $e_{CR}$) is sent in feedback on the differential amplifier 81 (inversion input −) so as to obtain an emission of light that is well controlled and stable with respect to temperature variations.

Furthermore, a set of resistances and potentiometers $R_1$ to $R_6$ are foreseen in order to polarize and regulate the neutral positions of the different elements in action. In particular, the feedback or counterreaction rate can be adjusted by using a potentiometer R5 disposed between the anode and the photodiode D and a reference potential chosen by convention as being that of earth. The direct input (+) of the differential amplifier 81 is also connected, via a resistance $R_4$, to the earth. The neutral position of the inversion input (−) of this amplifier is adjusted by means of a potentiometer disposed between a voltage source, equal to +5 V in the example chosen, furthermore, to the cathode of the photodiode D, and the earth. The slide of this potentiometer is connected via a resistance $R_2$ to the inversion input of the amplifier 81, this being, furthermore, connected to the output of the digitalanalog converter 80 via a resistance $R_3$. Similarly, the transistor 82 of the power amplification stage being of the NPN type in the example illustrated in FIG. 2, its emitter is connected, via a resistance $R_6$, to a negative voltage source −5 V.

Of course, all these elements are only described by way of simple illustration of an actual realization example of the devices of the invention and are adaptable to numerous other technological choices available to the man skilled in the art to accomplish the functions of the emitting power control means of the source S.

Once recorded on the optical disc 1, in zones reserved for this purpose, the binary words wil be readout and the effect of the power level emitted on the characteristic parameters of the engraving will be evaluated, and from this evaluation, the emitting optical power necessary to obtain an optimal engraving will be determined.

Figure 3:
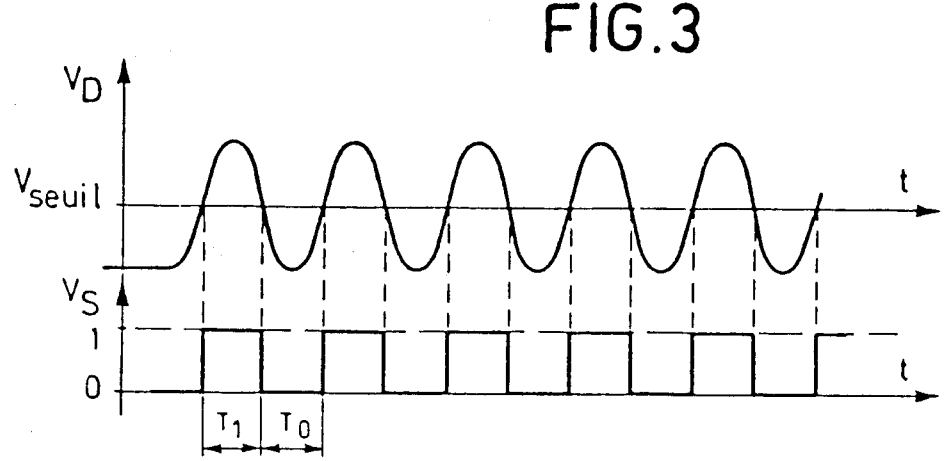
FIGS. 3 to 5 are diagrams illustrating several situations being presented within the scope of the data engraving by optical route.

FIG. 3 represents a diagram illustrating the trend of signals, for example, voltage signals, issuing from the opto-electronic conversion of the luminous radiation beam, reflected by the engraved surface of the optical disc 1 (FIG. 1) by the opto-electronic element 3. The upper curve illustrates the evolution in function of time of the signals $V_D$ present on the photo-electric cells output comprised in the optoelectronic member 3 and the lower curve the evolution of signals $V_3$ issuing from the forming of signals $V_D$, for example by using conventional threshold circuits operating at all or nothing. These signals present two logic levels "0" and "1" levels eash associated to a read logic level also corresponding to an "0" or "1" bit recorded on the disc.

FIG. 3 represents a read signal $V_D$ (and shaped as $V_S$) corresponding to an optimal engraving power. It follows from this that the amplitude of the read signals $V_D$ have their amplitude symetrically varied about an average value $V_{threshold}$ utilized as threshold value. It also follows from this that the cyclic ratio of the formed signals $V_S$ is equal to one or at least very close to this value. This cyclic ratio is the ratio ($T_1/T_0$) representing the respective durations of the signal $V_S$ at the state "1" ($T_1$) and at "0" ($T_0$), i.e., also the length of the engravings representing the recordings of a "1" bit and a "0" bit since there exists a bi-univocal correspondance between the read signal durations and the recording lengths, taking into account the speed of rotation of the disc 1.

Figure 4:
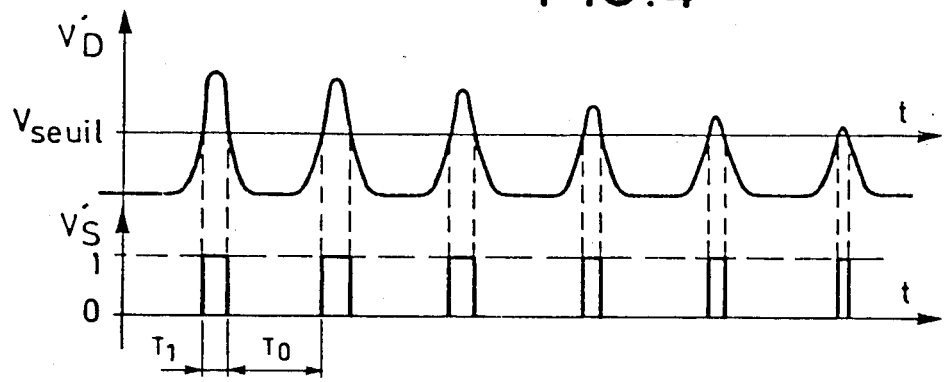

FIG. 4 represents the signals corresponding to a too low engraving power. Furthermore, in other to better illustrate the phenomenon, it has been supposed that the engraving power decreased in function of time (from left to right in FIG. 4).

If it is supposed that the threshold value $V_{threshold}$ is constant, it will be noted that the amplitude variations of the signals read $V'_D$ become increasingly dissymetrical with respect to this threshold value. It follows therefrom that the cyclic ratio $(T_1/T_0)$ of the shaped signals also increasingly deviates from the optimal value, i.e. from one. In the present case, the duration of the signals corresponding to an engraving of a "1" bit reduces, which is easily understood, the layer of material sensitive to the radiations generally presenting a sensitivity threshold and energy distribution of a laser beam able to be approximated to a Gaussian distribution, the length of a disturbance of the layer of this material corresponding to the effective exposure to the radiations correlatively reduced the optical power conveyed by the radiations.

Of course, one engraving can only correspond to one bit of the logic value "1" by convention. The inverse convention could just as well be adopted.

Figure 5:
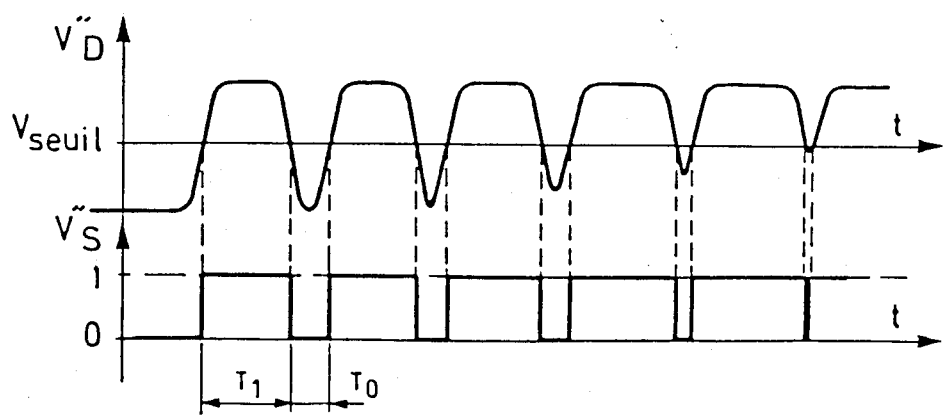

The diagram in FIG. 5 illustrates the inverse effect, i.e. when the power emitted by the laser source S is too high. The cyclic ratio $(T_1/T_0)$ of the signals $V_S$ after forming the read signals $V_D$ is thus greater than one and correlatively increases with the increase of the optical power received by the sensitive layer during engraving.

It is simple, through the use of appropriate circuits, to measure the durations $T_1$ and $T_0$ and to determine thereby what is the power having produced a correct engraving, i.e. that for which the cyclic ratio is the closest to one.

Figure 6:
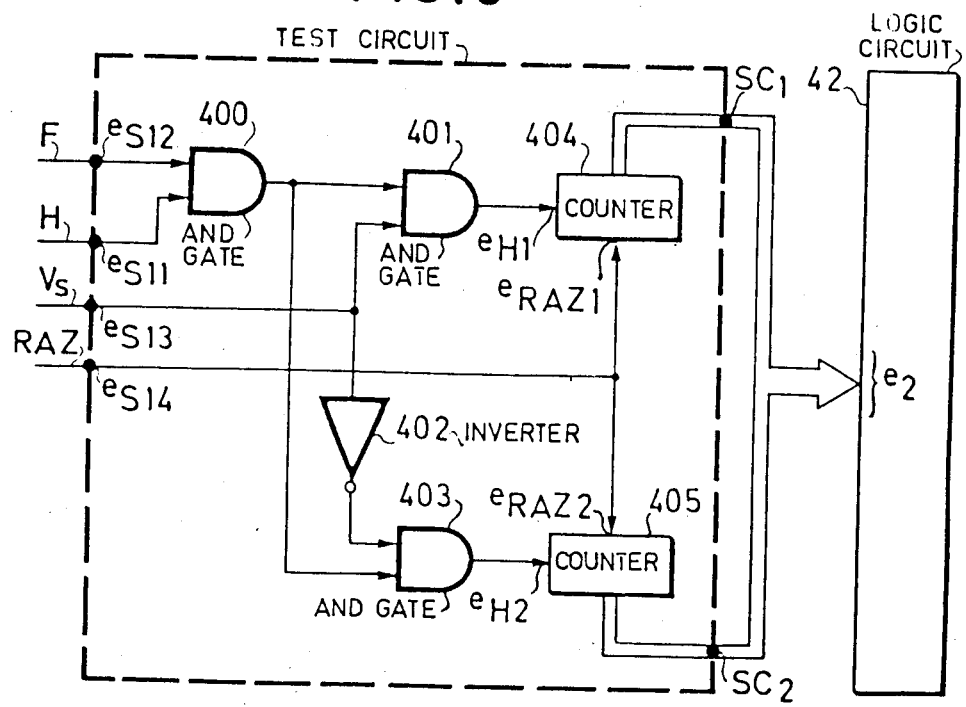
FIG. 6 represents an embodiment of a test circuit utilized within the scope of the invention.

FIG. 6 represents a practical realization example of test circuits 40 intended to measure durations $T_1$ and $T_0$.

A clock signal H delivered by the synchronization or timing circuit (FIG. 1: 41) that will be described in detail herein-under and of frequency equal to eight times that of the train of bits of the recording in the realization example, is transmitted through the input $e_{S11}$ to a first input of an "AND" logic gate: 400. This logic gate 400 allows to pass clock impulses for an time slot F equal to 64 bits, corresponding to the trains of 64 bits previously engraved. This time slot F is also supplied by the synchronization circuit (input $e_{S12}$) and transmitted to a second input of the logic gate 400. The clock impulses are orientated on the one hand, towards a counter 404 through the intermediary of a first input of an "AND" logic gate: 401 when the state of a signal $V_S$ issuing from the reading is at the level "1" (input $e_{S13}$), signal transmitted to a second input of the logic gate 401, and, on the other hand, towards a counter 405 through the intermediary of an "AND" logic gate: 403 when the state of the signal $V_S$ issuing from the reading is at zero level; signal transmitted to the "AND" gate: 403 by an inverter 402.

In the illustrated example the counters 404 and 405 are binary counters having parallel outputs $SC_1$ and $SC_2$. The outputs of the "AND" logic gates; 401 and 403 are respectively connected to incrementation inputs $e_{H1}$ and $e_{H2}$ of counters 404 and 405.

The counters 404 and 405 are reset to zero by a signal RAZ prior to the beginning of the strobe pulse F transmitted at reset to zero inputs $e_{RAZ1}$ and $e_{RAZ2}$. Thus are disposed at the end of the strobe pulse F of a duration equal to 64 bits, the total of the intervening clock impulses during the thirty-two sucessive states at "1" of the signal $V_S$ on the output of the counter 404 and the total of the intervening clock impulses during the thirty two successive states at zero of the signal $V_S$ on the output of the counter 405. The parallel outputs $SC_1$ and $SC_2$ of the counters 404 and 405 are connected to the microprocessor 42 controlling the apparatus that can thus carry out the comparison between the logic values conveyed by the outputs $SC_1$ and $SC_2$ and can thus determine the $T_1/T_0$ ratio (FIGS. 3 to 5), on an average carried out on 64 bits for greater precision.

If several successive trains of 64 bits or more have been recorded with staggered powers as was described in relation with FIGS. 3 to 5, it is possible at the microprocessor 42 to determine which of these engraving powers has produced the $T_1/T_0$ ratio the closest to one, and to put into memory this power value in order to carry out subsequent engravings.

Figure 7:
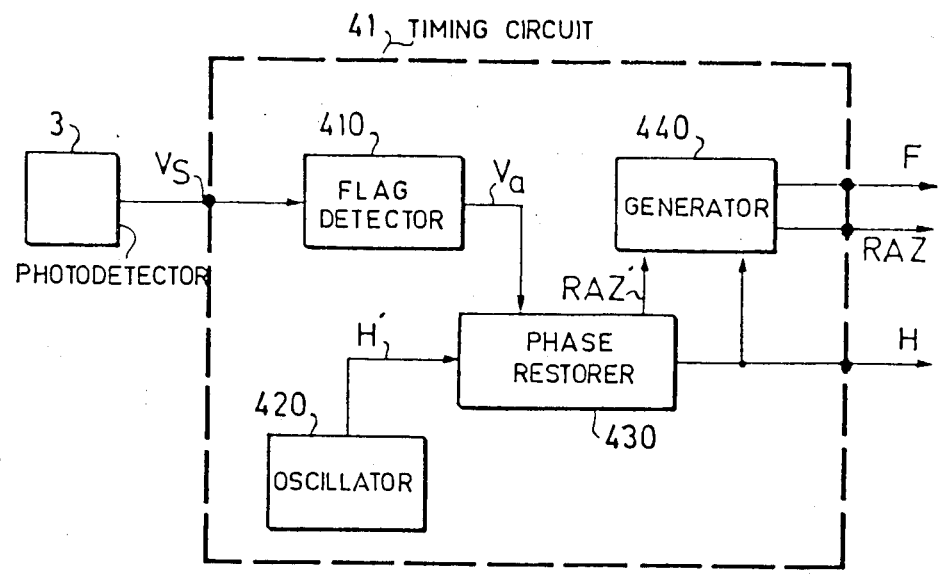
FIG. 7 represents an embodiment of a generator circuit of synchronization signals.

FIG. 7 illustrates an actual realization example of the synchronization or timing circuit 41 (FIG. 1).

This circuit has been assigned the duties, on the one hand, of acknowledging the beginning of a test word and on the other hand, of generating a signal F, representing a sampling window, of duration equal to the total duration of the number of bits of the test word (sixty-four in the example selected) and a clock signal H in phase with the signals read.

First of all it is necessary to recognize, among all the data recorded on the disc, the specific data representing the test words. Numerous methods are known, Preferentially, although non-limitative, will be utilized in the scope of the invention the teaching of French Patent application filed on 12 March 1982 under n° 82 04219 in the name of the present applicant.

According to the above-mentioned patent application, the useful recorded data are associated to specific data or "flags" acting to resynchronize the reading means utilized. Preferentially, the useful data and the specific data are coded according to the NRZ code; the specific data being associated to the impulse durations not utilized in the NRZ code. If T is the period that represents the duration of an elementary binary signal or bit and which corresponds to a rhythm frequency $F=1/T$, for specific data a duration equal, for example, to one and a half times the period T is selected.

The synchronization circuit 41 thus comprises a first element 410, that will be called "flag detector" receiving the signals read $V_S$ delivered by opto-electronic detection circuits or photo-detectors 3 and intended to discriminate, among the flow of recorded data, the specific data or flages. These data are recorded at the beginning of the test word in known relation to time with the useful data, i.e., the alternate string of "1" and "0" logics composing the binary test word (sixty four bits in the example chosen).

The synchronization circuit 41 also comprises an oscillator 420, for example, a quartz oscillator delivering a multiple frequency signal H of the bit frequency. This frequency must be high enough to ensure accurate operating, for example, eight times the bit frequency F as set out in relation with the description of FIG. 6. These signals must also be maintained in phase with the signals $V_S$ issuing from the reading and received from the output of the opto-electronic detection circuits 3. With this aim, is foreseen a phase restorer 430 receiving a signal $V_a$ delivered by the flag detector element 410 and indicating the beginning of the test word, utilized as operating authorization signal, phase restorer that generates by return, from clock signals H', clock signals H that are also transmitted to a generator 440 of the signal F of sampling window. The clock signals H are synchronized on one of the transitions of the signals $V_s$, for example the rising front of the impulses representing a "1" logic.

Accessorily, from window F, can be generated the RAZ signal for resetting at zero counters 404 and 405 of the test circuit 40 (FIG. 6).

The different elements that have been described can be realized according to the teaching of the above-mentioned French patent application.

By way of example, the discrimination element 400 can be realized on the basis of two monostable circuits actuated, for example, by the leading edge of the impulses issuing from the reading and generating impulses of a duration slightly superior and slightly inferior to one and a half times the period of bit T. The logic intersection of these two impulses can be utilized to determine whether the impulse issuing from the reading is associated to a flag (duration 1.5 T).

The phase resetting circuits 430 can be realized by using a voltage controlled oscillator (V.C.O.) and provided with a phase locking loop (P.L.L.) comprising a phase comparator, receiving the signals delivered by the flag detector 410 and the oscillator 42. This oscillator is reset in phase at each flag detection.

The signal generator 440 of time window F can be constituted on the basis of a binary counter incremented by clock signals H. It is furthermore reset at zero at the beginning of counting by a RAZ' signal derived from the authorization signal $V_a$ supplied by the flag detector 410 and positions at a first logic stage, for example, at the logic state "1", the signal F. At the end of counting, i.e. at maximal capacity which must be an integer multiple of the number of bits of the test word, it positions the signal F at the second logic state, "0" in the example selected. As described hereinbefore, these synchronization signals are utilized by test circuits 40 and data processing circuits 42.

Furthermore, as indicated hereinbefore, the circuit elements can be selected from among these currently available on the market. By way of example, integrated circuits of the 74 F191, HA 5195 type, a 6809 type microprocessor and a laser diode emitting radiations having an optical power of 15 mW and wavelength centered on 820 nm can be utilized.

The test carried out as described immediately hereinabove can of course be repeated several times on the periphery of the disc, both in a zone close to the axis of rotation and in the periphery in order to eliminate any eventual local defect in the sensitive layer than could lead to an erroneous interpretation of the result.

Figure 8:
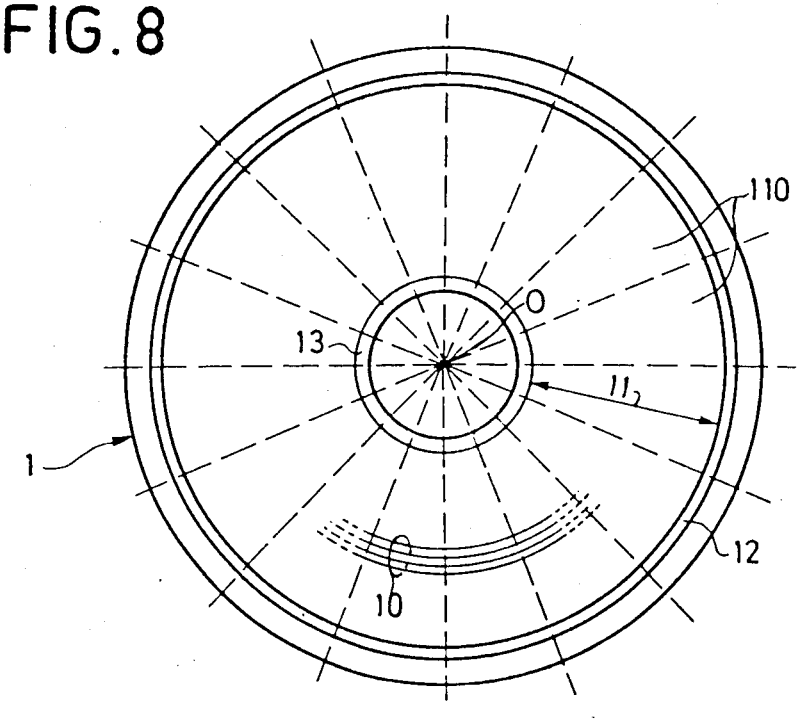
FIG. 8 illustrates schematically a particular structure of an optical disc on which the test words have been registered.

The device according to the invention necessitates that reserved zones for recording the test words be foreseen, i.e. zones not for utilization in recording useful data. However, this does not constitute a real limitation. Indeed, if 250 tracks are foreseen on the periphery of the disc and the same quantity in a central zone close to the axis of the disc in order to carry out calibration tests, the area occupied on the disc is typically smaller than 0.5 millimeter total width for each group of 250 tracks, which is very small on a disc of 30 centimeters diameter. Moreover, taking into account a lower request on error rate than for the useful engraving, these tracks can be placed outside the zone generally utilized for the engraving of useful digital data just before the beginning and just after the end of this zone. Such a disposition is illustrated by FIG. 8.

Within the scope of the applications envisaged for recording the digital type data, it is practice to utilize discs, the diameter of which is generally 30 cm, as has been recalled hereinabove, and generally comprising about 40 000 tracks 10 disposed on a ring 11 of a width of 8 cm or useful zone. Most often the recordings are disposed in zones delimited in advance or angular sectors 110. Typically, this number of sectors is about from 10 to 25.

In this arrangement, two annular zones 12 and 13 can thus be reserved, adjacent to the useful zone 11 and respectively in the periphery (zone 12) or close (zone 13) to the center 0 of the disc 1. Preferentially, the test words are regularly distributed in these sectors.

It is possible to start from the hypothesis that 3200 blocks of 64 bits per track can be engraved, thus 800 000 blocks for 250 tracks. It is thus possible, if at each test four groups of eight blocks are engraved, disposed on a circumference of the disc, to carry out 25 000 tests, as many in a peripheral zone 12 as in the internal zone 13.

This represents, in the case of intensive utilization of the disc and at the rate of one test every 24 hours about 70 years utilization possible of the disc, 24 hours.

It is thus established on this actual realization example that the carrying out of the calibration process of the power emitted by the source does not provoke any perceptible degradation of either the recording capacity of the disc or its lifespan, while allowing to integrate in the power measurement a large number of parameters that were not taken into account in the prior art processes.

The steps of the calibration process according to the invention can be resumed as follows:
  (a) recording of a predetermined number of binary test words, each binary word being registered with a distinct optical power level: each binary word being constituted by a sequence of bits according to a regular succession at logic states "0" and "1";
  (b) reading of these binary test words;
  (c) analysis of each binary word, this analysis being preferably made by carrying out the average on the number of bits of binary words;
  (d) determination from this analysis of the optical power to be utilized;
  (e) and elaboration from this determination of an control value of the power emitted by the source and the memorizing of this value.

In preferred variants, the process comprises furthermore supplementary recording steps of several groups of binary words regularly distributed, on the one hand, according to angular sectors and, on the other hand, in two zones, one close to the periphery, the other close to the central zone of the disc.

As indicated herein-above, the first supplementary measurement allows to determine the average that remove risks of errors due to dispersions and aberrations in the sensitivity characteristics of the layer of material sensitive to radiations and the second measurement allows to carry out an interpolation, and from interpolation is deducted the value of the optimal optical power necessary for the recording, the length of a radial axis, taking into account the predeterminal law of variation.

In order to clarify this point, an average value of the optical engraving power of the internal radius of the recording annular zone (FIG. 8: 11) is typically 8 mW. Tests are conducted on either side of this value with increments of 0.5 mW, for example.

With regard to the interpolation, it has been established that a typical average value of the optimal engraving power is 11 mW in external radius. The annular zone can be divided, for example, into four annular sub-zones for which the values 8, 9, 10 and 11 mW will be maintained in the case where the extreme values are 8 and 11 mW.

What is claimed is:

1. Device for recording data in an optically detectable form at the surface of a data support comprising a material sensitive to optical radiation, said device comprising means for focusing in said surface an optical beam electrically modulable by an incident electric signal for imparting local modifications of optical characteristics in said surface, means ensuring the exploration of said surface along any one of a plurality of adjacent track elements with a light spot projected by said optical beam, electro-optical reading means the interaction of which with said modifications of optical characteristics produce an electric reading signal and control means allowing to adjust the power of said optical beam in such a way that said electrical reading signal suitably reproduces the temporal distribution of the impulses constituting said incident electric signal, wherein binary test words are recorded in an area of said surface arranged sidely of the area specifically alotted to the storage of said incident electric signal with several staggered power values of said optical beam and wherein the analysis of the portion of said reading signal corresponding to said staggered power values allows to determine which power value is most suitable for recording said incident electric signal in said specifically alotted area; said control means comprising a calibrating circuit associated to a control or drive circuit of the source of said optical beam; said calibrating circuit comprising a memory logic circuit controlling the writing and the reading of said binary test words according to a predetermined cycle and an analysis circuit of the reading signal delivering tested values to said memory logic circuit, in order to assign said power value to said optical beam, prior to the beginning of a recording of said incident electric signal.

2. Device according to claim 1, wherein said tested values ($SC_1$, $SC_2$) represent the respective durations $T_0$ and $T_1$ of the logic values "0" and "1" of the reading signal of the binary test words.

3. Device according to claim 2, wherein the binary test words are written in the form of monotonous series of binary elements alternately at a first logic value and a second logic value of equal durations.

4. Device according to claim 3, wherein said power value corresponds to the detection by the memory logic circuit of the least departure between said tested values.

5. Device according to claim 1, wherein said analysis circuit comprises counting means.

6. Device according to claim 1, wherein said data support is a disc organized in sectors; the said binary test words being disposed in said sectors.

7. Device according to any one of claims 1 or 6, wherein said data support is a disc comprising an annular zone, of determined internal and external radii, specifically alotted to the recording of said incident electric signal; at least two binary test words being assigned, one to a zone of said surface situated at a distance smaller than or equal to the internal radius and the other to a zone situated at a distance from the axis of rotation of said disc superior or equal to said external radius, and wherein it comprises in said memory logic circuit means for determining the level of optimal control of the writing power in function of a writing radius by interpolation of memorized values of said power in each of said binary test words.

8. Device according to claim 1, wherein each binary test word comprises a determined number of pairs of binary elements at alternated logic values and wherein the determination of the ratio between the durations at the first logic value and at the second logic value is obtained by carrying out the average on said determined number.

9. Device according to claim 1 in which said data support is an optical disc comprising at least one layer of material sensitive to luminous radiations, said device comprising: a source of a beam of these luminous radiations, access means to said specifically alotted area, means for focussing said beam on said layer for recording said incident electric signal, optoelectronic reading means; said control means causing the recording in said layer at said sidely arranged area of at least one message comprising several binary test words associated to distinct engraving powers, each test word being constituted by a monotonous string of binary elements alternately at first logic values and at second logic values of equal duration; said opto-electronic reading means converting said recorded binary words into binary electric signals; said analysis circuit comprising means for evaluating the durations of the binary signals at a first logic value and the durations of the binary signals at a second logic value; said memory logic circuit elaborating the ratio between the durations of the binary signals at a first logic value and the durations of the binary signals at a second logic value and producing a signal selecting a power to be emitted by said source for which said ratio is nearest to one; said device further comprising means for synchronization of the operation of said analysis circuit and further means for the determination and memorization of the signal selecting said power to be emitted by said source.

10. Device according to claim 9, wherein said evaluation means comprise a first binary counter having an incrementation input receiving clock signals within first time intervals during which said read binary signals present a first logic value, a second binary counter having an incrementation input receiving said clock signals within second time intervals during which said read binary signals present a second logic value, logic means for orientating said clock signals towards said first binary counter during said first time intervals and towards said second binary counter during said second time intervals, said logic means enabling the supply of said clock signals during a total time period corresponding to the reading and conversion time of said binary test words, and means for resetting at their initial states said two binary counters, and wherein said two binary counters are counters with parallel outputs delivering on these outputs respectively a first binary word representing the total duration of said binary signals at said first logic value and a second binary word representing the total duration of said binary signals at said second logic value.

11. Device according to claim 10, wherein said memory logic circuit comprise data processing means comprising memories respectively loaded with the first and second binary counts respectively delivered by said first and second binary counters; means computing the ratio between said stored counts and another memory loaded with a binary control word corresponding to the optical power value to be emitted by the source for which said ratio is nearest to one.

12. Device according to claim 11, wherein the recording of binary test words comprising the recording of at least two binary test words, said memory logic circuit performs the interpolation according to a predetermined law among a plurality of control words for which said ratio is nearest to one.

13. Device according to claim 1, wherein said memory logic circuit is implemented using a microprocessor circuit.

14. Device according to claim 1, wherein the source of said optical beam is a laser diode; said control circuit comprising a digital-analog converter receiving from said memory logic circuit said power value in digital form and delivering a signal to one input of comparator means supplying a control current to said laser diode; optical feedback means coupled with said laser diode feeding a further input of said comparator means.

15. In a data processing system for use in recording or retrieving information signals, said information signals being recorded in adjacent track elements arranged within an annular portion of a disk surface, said surface being optically recordable using radiant energy within a range of raising write power values, an apparatus comprising: optical means for directing toward said surface a focussed beam of said radiant energy thereby projecting in said surface a light spot for scanning one at a time said track elements, and further track elements arranged sidely of said annular portion in at least one further annular portion of said surface, said optical means comprising optical source means having a signal input for receiving said information signals and a control input for setting the write power value of said beam in a proper condition within said range, said optical means further comprising, for retrieval of information stored in said track elements, photodetector means collecting radiant energy emerging from the portion of said surface illuminated with said spot; and write power control means activated prior to a recording step of said information signals for causing said optical means to retrieve from said further annular portion prewritten power dependent information, and for deriving therefrom power select data applied to said control input, so that since the beginning of said recording step the write power value assigned by said power select data is such that what is recorded in said annular portion is representative of said information signals.

* * * * *